United States Patent [19]

MacNeill

[11] 4,014,483
[45] Mar. 29, 1977

[54] LIGHTER-THAN-AIR CRAFT

[76] Inventor: Roderick M. MacNeill, 23 Woodbury Road, Southborough, Mass. 01772

[22] Filed: Sept. 15, 1975

[21] Appl. No.: 613,221

[52] U.S. Cl. .............................. 244/5; 244/23 C; 244/137 P
[51] Int. Cl.² ...................... B64C 39/00; B64B 1/04
[58] Field of Search ............ 244/5, 12 C, 23 C, 29, 244/90 R, 137 P

[56] References Cited
UNITED STATES PATENTS

| | | | |
|---|---|---|---|
| 3,469,804 | 9/1969 | Rowan | 244/12 C |
| 3,514,053 | 5/1970 | McGuinness | 244/23 C X |
| 3,752,417 | 8/1973 | Lagace | 244/12 C |
| 3,820,744 | 6/1974 | Denton | 244/5 |
| 3,934,847 | 1/1976 | Bentivegna | 244/137 P |

Primary Examiner—Stephen G. Kunin
Assistant Examiner—Barry L. Kelmachter
Attorney, Agent, or Firm—Cesari and McKenna

[57] ABSTRACT

A lighter-than-air craft having a discus shape. A passenger compartment is located at the top center of the craft and a payload pod at the bottom center beneath the passenger compartment. The pod connects to the passenger compartment by a passageway which extends up through the center of the craft. Moreover, the pod is detachable from the craft, and can be raised or lowered to the ground, thus eliminating the need to land the craft in picking up or discharging passengers and cargo. The discus shape, together with a plurality of automatically controllable ailerons distributed about the circumference of the craft, improve the stability and control of the craft in flight.

12 Claims, 8 Drawing Figures

LIGHTER-THAN-AIR CRAFT

BACKGROUND OF THE INVENTION

This invention relates to aircraft, and more particularly, to a multi-purpose lighter-than-air craft.

Interest has increased recently in lighter-than-air craft as a means of transporting passengers and cargo by air. Unlike the conventional airplane, which requires maintained motion of its wings relative to the air for lift, the lighter-than-air craft is lifted by a contained volume of lighter-than-air gas. Lighter-than-air craft have many desirable features. For example, they land and take off on runways which are shorter than those conventional aircraft of comparable payloads require. They can carry large numbers of passengers and large amounts of cargo. Since they typically consume substantially less fuel during takeoff and landing than conventional aircraft, they can be relatively economical to operate. Additionally, they can be considerably more quiet and less polluting during takeoff and landing than conventional aircraft.

Notwithstanding these features, lighter-than-air craft have experienced little practical use to date. Several reasons account for this limited use.

For example, the lighter-than-air craft presently known in the art are generally difficult to control and manuever during flight. Relatively large, unobstructed ground areas have been required to allow for uncontrolled drift of the craft upon leaving or approaching the ground. These problems are aggravated by high winds and turbulent air currents. Such conditions frequently force the grounding of lighter-than-air craft, thereby reducing productive flight time.

Additionally, in conventional lighter-than-air craft, the pilot is generally required to vent substantial quantities of the lighter-than-air gas to lower the craft to the ground. Special facilities and time must be made available for securely anchoring the craft to the ground during the loading and unloading of passengers and cargo, and for replenishing the supply of lighter-than-air gas for subsequent takeoff.

It is, therefore, an object of this invention to provide a more stable and controllable lighter-than-air craft.

Another object of this invention is to provide an lighter-than-air craft in which the effects of winds and turbulent air currents on the craft's stability are minimized.

Still another object of the invention is to provide a lighter-than-air craft which facilitates loading and unloading of passengers and cargo.

Still another object of the invention is to provide a lighter-than-air craft which minimizes the time and ground space required for loading and unloading passengers and cargo.

SUMMARY

In accordance with this invention, a lighter-than-air craft has a substantially discus shape so as to minimize drag and wind resistance about the craft's circumference. A plurality of ailerons distributed about the circumference of the craft compensate the craft as wind direction and velocity change. Pilot effort in stabilizing the craft therefore is minimized.

In an illustrative embodiment of the craft of this invention, a passenger and crew compartment is located at the top center of the craft, while a payload pod is located at the bottom center beneath the passenger and crew compartment. The pod connects to the passenger and crew compartment by a passageway which extends up through the craft's center. Moreover, the pod is detachable from the craft and can be lowered to the ground with the craft maintained at a considerable altitude above the ground. The craft can thus hover safely above a relatively small ground area to load and unload passengers and cargo, and need land only for periodic maintenance checks and repair.

The invention is pointed out with particularity in the appended claim. The foregoing and other features and advantages of the invention will be better understood by reference to the following detailed description taken in conjunction with the accompanying drawings.

DETAILED DESCRIPTION

Figure 1:
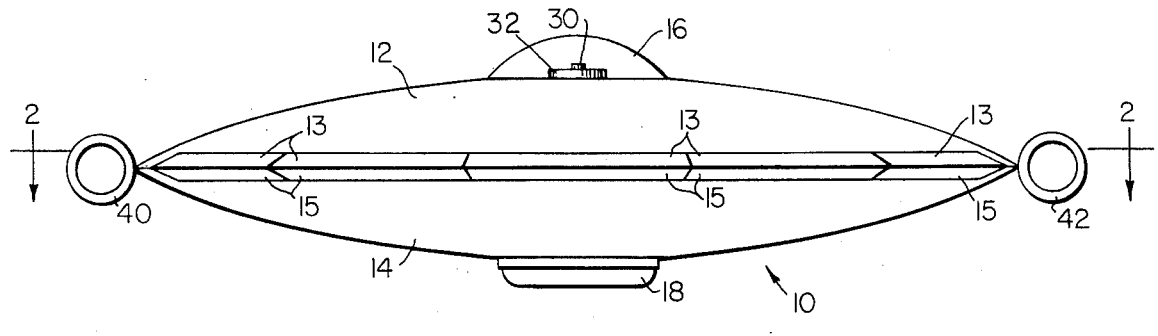
FIG. 1 is a side elevation of an illustrative embodiment of the aircraft of the invention.
Figure 2:
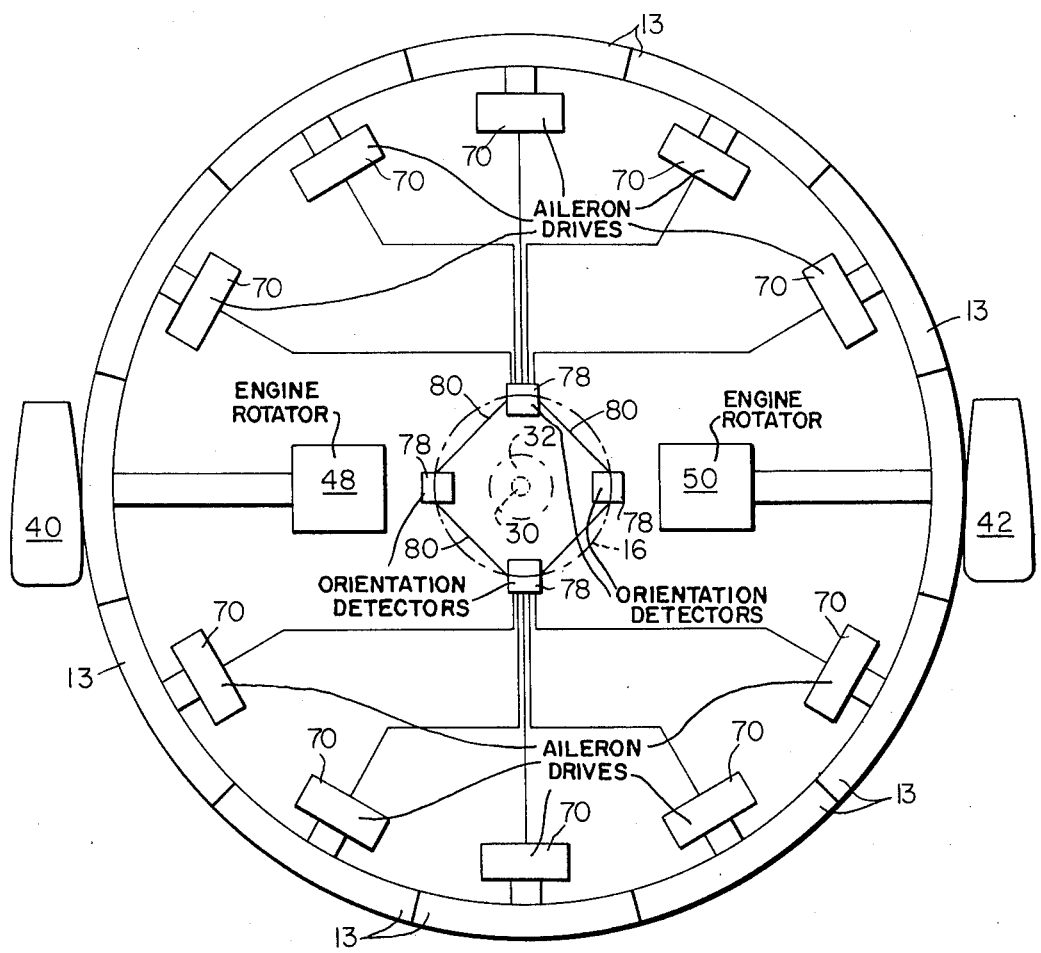
FIG. 2 is a top view of the aircraft of FIG. 1 with the upper hull portion removed for showing control elements internal to the craft.
Figure 3:
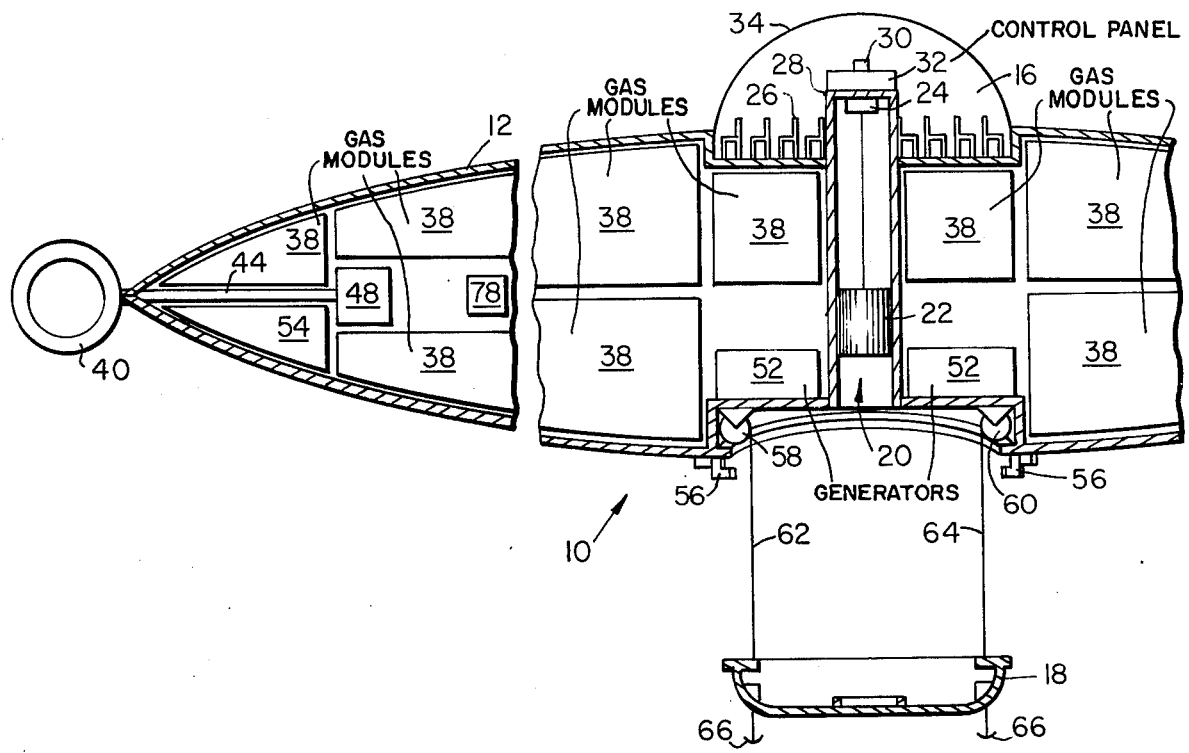
FIG. 3 is an enlarged cross-sectional view of one end of the craft of FIG. 1.

In FIGS. 1, 2, and 3, a lighter-than-air craft 10 comprises upper and lower hull portions 12 and 14, respectively. The hull portions 12 and 14 combine to provide craft 10 with a substantially discus shape. Thus, craft 10 has a maximum height or thickness near its center and a gradually decreasing thickness in a radial direction to the circumference of the craft. Preferably, this craft 10 is symmetrically shaped about a vertical axis which extends through the upper and lower hull portions 12 and 14 at the craft center. Thus, as viewed from the top or bottom, craft 10 is circular in outline, as indicated in FIG. 2. Also, the maximum center height or thickness of the craft is preferably no larger than about one-fifth of its overall diameter. The thickness of the craft at its circumference is preferably as small as possible.

The discus shape of craft 10 minimizes drag and wind resistance about the craft circumference. This reduces the effect of wind on the craft and improves the stability of the craft in flight. A plurality of upper and lower ailerons 13 and 15, respectively, also improve flight stability. As seen in FIG. 1, ailerons 13 and 15 are attached about the circumference of hull portions 12 and 14. When manually or automatically activated, ailerons 13 and 15 move radially outwardly from hull portions 12 and 14, respectively, to provide control surfaces which react with the wind to tilt the craft either upwardly or downwardly as viewed in FIG. 1. They can be automatically controlled to compensate for changes in the craft's orientation due to winds or turbulent air currents. The operation of ailerons 13 and 15 is described in more detail below in connection with FIGS. 4A and 4B of the drawing.

A passenger and crew compartment 16 is located at the top center of hull portion 12; and a payload pod 18 is located at the bottom center of hull portion 14 under compartment 16. As seen in FIG. 3, a vertical, centrally disposed passageway 20 connects the pod 18 and compartment 16. An elevator 22 located in the passageway 20 and an elevator motor 24 transport passengers and crew between the pod 18 and the compartment 16. Obviously, other transport means, such as stairs or ladders, could be substituted.

As seen in FIG. 3, the compartment 16 has a plurality of passenger seats 26. A pilot's chair 30 is situated on a platform 28 at the center of the compartment 16. A control panel 32 surrounds the pilot's chair 30 and includes all of the necessary means for activating the various steering, propulsion and control mechanisms of the craft. This control panel 32 and chair 30 arrangement permit the pilot to operate the craft 10 while facing in any direction. Moreover, if a dome 34, formed of a transparent material, encloses the compartment 16, both the pilot and passengers have visibility in all directions.

The illustrated configuration of craft 10 has a number of inherent advantages. Since payload is typically a significant fraction of the total weight of the craft, the location of payload pod 18 at the bottom center of the craft provides the craft with a low center of gravity. Additional stability is thus provided in maintaining the craft in level, upright orientation. Passenger and crew compartment 16 is safely positioned at the top center of craft 10. If the craft is forced to the ground in an emergency, the passengers and crew are maintained in relative safety. The hull portions 12 and 14 would absorb a significant portion of any impact. Although not shown, compartment 16 could include one or more emergency exits, or dome 34 could be made ejectable, in the event that passage through pod 18 is not possible.

A plurality of lighter-than-air, self-contained gas modules 38 (FIG. 3) are distributed internally of hull portions 12 and 14 to provide lift. A lighter-than-air gas, such as helium, can be used. The use of these modules also has several advantages. For example, if one module is damaged, the total lift capacity of the aircraft is only reduced by a small amount. Thus, even if one module vents all its gas, the pilot can compensate for this loss of lift capacity. Moreover, replacement of damaged modules is less expensive than the repair or replacement of a large gas container. Furthermore, the lift capacity can be tailored to meet the load requirements during a flight either by varying the number of modules that are aboard or by varying the amount of gas that each module contains.

Still referring to FIG. 2, a pair of jet engines 40 and 42 attached at diametrically opposite positions at the circumference of the craft 10 provide the thrust for propelling the craft in flight. These engines 40 and 42 are rigidly mounted on the ends of shafts, such as shaft 44 extending from rotators 48 and 50, respectively. As the pilot activates the rotators 48 and 50 to turn the shafts about their longitudinal axes, the jet engines 40 and 42 rotate in a vertical plane. Thus, by controlling the relative thrusts from and orientation of the engines 40 and 42, the pilot can direct the craft 10 to any orientation. That is, he can cause the craft 10 to move in a forward or reverse direction, to roll, to yaw or to pitch. If the jet engines 40 and 42 are vertically oriented, the pilot can maintain altitude (e.g. in the event of loss of lighter-than-air gas), hasten ascent, or force descent.

The ability to force descent leads to yet another advantage: there is no need for venting gas from modules 38 during normal landing operations.

Rotators 48 and 50 and their respective shafts represent means for rotating the jet engines 40 and 42 in response to pilot or automatic command control. For example, they may comprise electric motors which operate in response to electrical control signals from control panel 32. Power to these motors, the control panel 32, and to other mechanisms in craft 10, such as elevator motor 24, can be provided by generators 52 or any other suitable power source (e.g. batteries). Alternatively, rotators 48 and 50 may be components in a hydraulic system.

Fuel for jet engine 40 is contained in a fuel tank 54 (FIG. 3) located within hull portion 14 at the bottom of the craft. A similar fuel tank, not shown in FIG. 3, is provided at the other end of the craft for jet engine 42. Although not shown, suitable safety barriers, such as vertical explosion and fire retardant walls extending between hull portions 12 and 14, would be located in the craft to shield compartment 16 and pod 18 from the various fuel tanks.

Control panel 32 includes means accessible to the pilot for starting and stopping the jet engines 40 and 42. The pilot can thus shut the engines down when not needed, for example, when parking craft 10 in the air, and turn the engines back on, for example, when departure from the air space is desired, all while sitting at control panel 32.

As indicated in FIG. 1 and best seen in FIG. 3, payload pod 18 can be detached from hull portion 14 and lowered to the ground. Retractable clamps 56 attached to hull portion 14 hold pod 18 in position at the bottom of craft 10. When they are released, hydraulic or electric motors 58 and 60 can lower the pod 18 by means of cables 62 and 64. Preferably, the cables 62 and 64 are long enough to lower the pod 18 to the ground with craft 10 hovering safely at a considerable altitude (e.g., 100 feet or more) above the ground. Anchors 66 secure the pod 18 to the ground while passengers and cargo are loaded and unloaded. Although not shown in FIG. 3, the pod 18 includes one or more access doors.

Thus, cargo and passengers can be loaded in or unloaded from payload pod 18 on the ground without ever landing craft 10. Only a relatively small ground space, sufficient in size to accommodate pod 18, is required for the exchange. The area can be otherwise obstructed with tall trees or buildings which can be safely avoided by maintaining sufficient altitude of craft 10. The equilibrium of craft 10 in the air above pod 18 is maintained automatically by ailerons 13 and 15, or, if necessary, manually by the pilot using jet engines 40 and 42.

In accordance with another aspect of this configuration, the anchors 66 can be set with the pod 18 on the ground and the motors 58 and 60 can be energized to winch the craft 10 to the ground. Additionally, the cables 62 and 64 may be releasably connected to the pod 18, thereby to facilitate the exchange of pods.

Figure 4A:
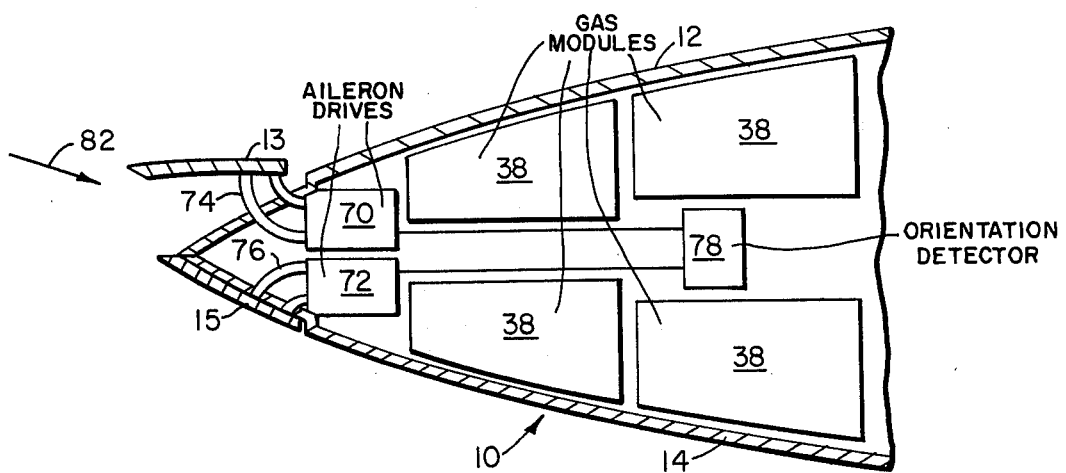
FIGS. 4A and 4B are enlarged cross-sectional views of one end of the craft illustrating the operation of the ailerons.
Figure 4B:
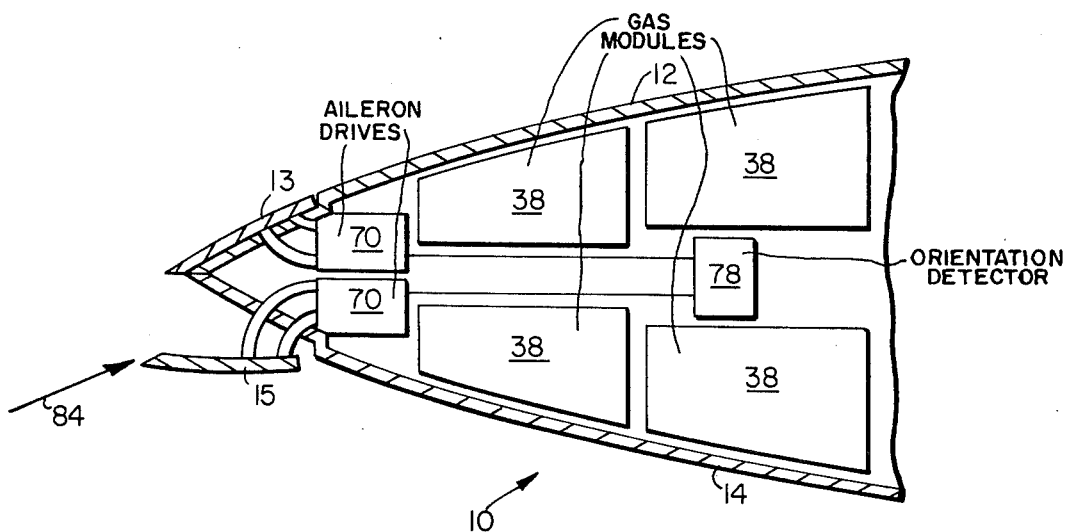

Referring to FIGS. 4A and 4B, aileron drives 70 and 72 connect to ailerons 13 and 15 by way of arms 74 and 76, respectively. The drives 70 and 72, which are typically electric motors, form part of a servomechanism including a craft orientation detector 78. As shown in FIG. 2, there are illustratively four of such detectors 78 in craft 10 and each one of the four is electrically interconnected by leads 80. Detectors 78 sense changes in the orientation of craft 10 from a reference plane, e.g., horizontal. Each detector may comprise a gyroscope or mercury switch which develops an error signal indicative of a change in craft orientation. These error signals are in turn sent to selected ones of drives 70 and 72 to activate their associated ailerons and to compensate for the change.

For example, in FIG. 4A, an upper aileron 13 is shown in an activated position away from hull portion 12. It is assumed that a wind blowing essentially in the direction indicated by arrow 82 has caused the end of craft 10 shown in FIG. 4A to move downwardly out of the desired orientation, and has caused one of detectors 78 to sense this and to move aileron 13 into the position shown. The wind will react with aileron 13 in the illustrated position, generating a upward force on the inner surface thereof, which causes the end of craft 10 to move upwardly, thus compensating for the change initially caused by the wind.

In FIG. 4B, a lower aileron 15 is shown in an activated position away from hull portion 14. It is assumed in this case that a wind blowing essentially in the direction indicated by arrow 84 has moved the end of craft 10 shown in FIG. 4B upwardly, causing one of detectors 7B to sense this and to activate aileron 15. The wind now exerts a downward force on the inner surface of aileron 15, causing the end of craft 10 to move downwardly, again compensating for the change initially caused by the wind.

Ailerons 13 and 15 in this way assist in maintaining the equilibrium of craft 10, even in face of changing winds, and turbulent air currents. The servomechanism comprised of the detectors 78, drives 70 and 72, and ailerons 13 and 15 is preferably designed with a speed of response considerably shorter than a pilot could provide in manually adjusting the ailerons. Also, to compensate for particular changes in the attitude of craft 10, it is preferable that more than one aileron be activated at a given time. For example, at one end of craft 10, two or more adjacent upper ailerons 13 may be activated, while at the opposite end of craft 10, two or more lower ailerons are activated. Moreover, adjacent ailerons may be activated to differing levels and angles of inclination, thus imparting a warping effect about the circumference of the craft.

The pilot is also provided with control means such as a joy stick control at panel 32 for disabling the servomechanism and for manually operating ailerons 13 and 15 to assist the steering of craft 10 during maintained flight through the air. For example, the ailerons can be used by the pilot to initiate a departure from level flight.

Figure 7:
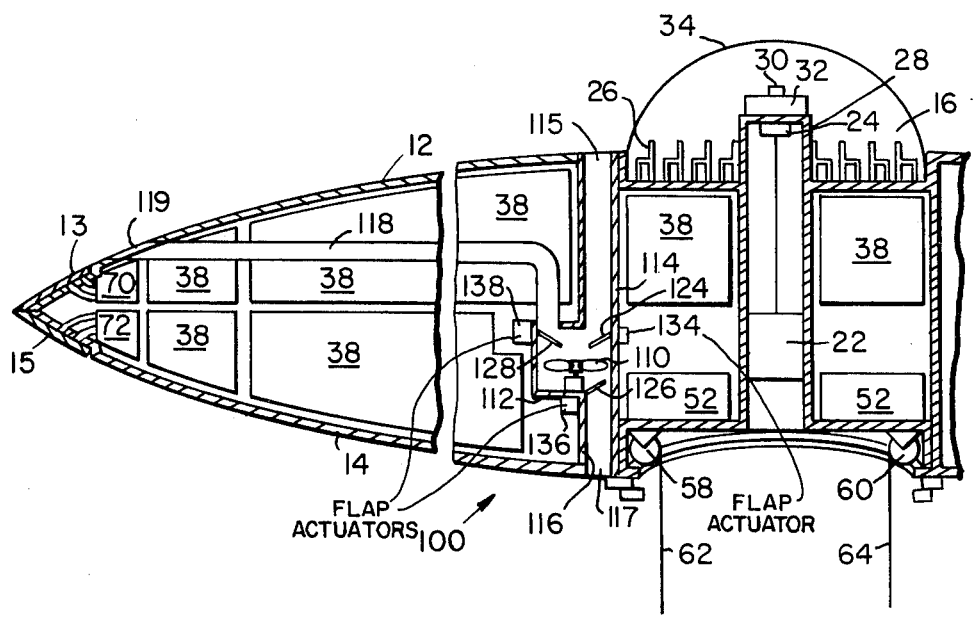
FIG. 7 is an enlarged cross-sectional view of one end of the craft of FIG. 5.
Figure 5:
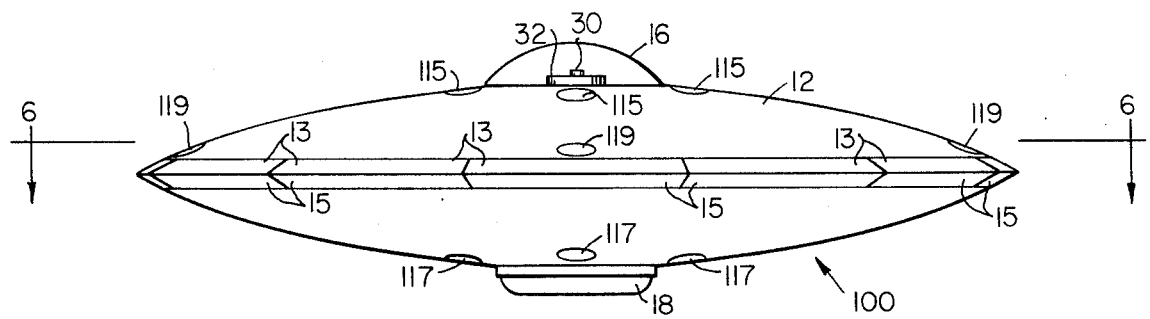
FIG. 5 is a side elevation of another illustrative embodiment of the aircraft of the invention.
Figure 6:
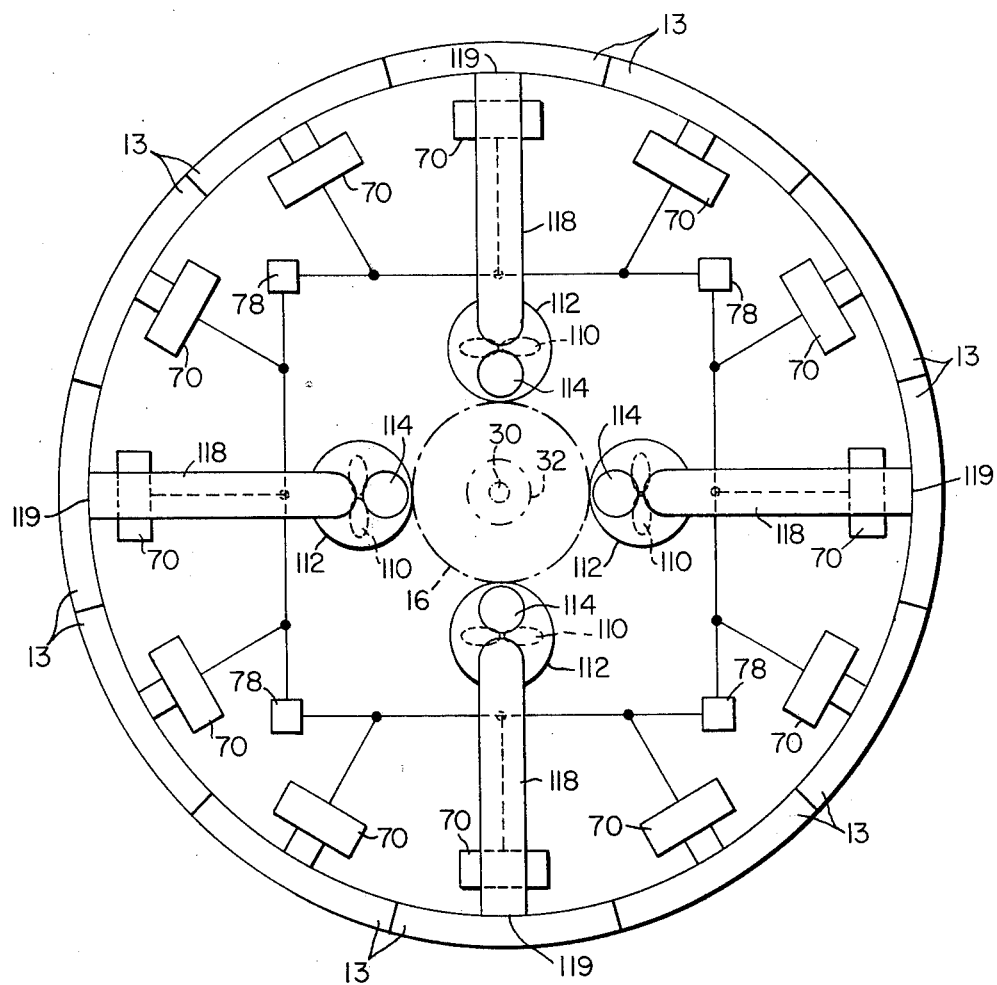
FIG. 6 is a top view of the craft of FIG. 5 with the upper hull portion removed for showing control elements internal to the craft.

The craft embodiment 100 shown in FIGS. 5, 6, and 7 contains an internal propulsion mechanism. Otherwise, the craft 100 is similar in construction to craft 10 of FIGS. 1 through 4 and like reference numerals indicate like components in the Figures.

As seen in FIGS. 6 and 7, the craft 100 includes four fans mounted near the center of gravity of the craft. As best seen in FIG. 7, each fan 110 is separately enclosed in a housing 112, and three air ducts extend from each housing 112. A first air duct 114 extends upwardly in the craft to an opening 115 at the top of hull portion 12. A second air duct 116 extends downwardly in the craft to an opening 117 at the bottom of hull portion. A third air duct 118 extends laterally in the craft to an opening 119 (FIG. 5) near the craft circumference.

At the juncture of the air ducts 114, 116, and 118 and housing 112, adjustable pivoted flaps 124, 126, and 128, movable by flap actuators 134, 136, and 138, respectively, vary the relative air flow through each duct. Flap actuators 134, 136, and 138, which are typically electric motors, are controllable by the pilot through suitable control means located at control panel 32. Also, the pitch of each fan 110 is variable by the pilot through suitable control means at control panel 32 to vary the rate and direction of the air flow through ducts 114, 116 and 118. Fans 110 can thus move air upwardly, downwardly or laterally through the craft depending upon the flap and fan pitch selections made by the pilot.

The pilot can use this propulsion mechanism to propel craft 100 in a forward, reverse or lateral direction, or to hasten ascent or force descent of the craft. For example, to force descent of craft 100, the pilot activates flap 128 to close lateral air duct 118. Flaps 124 and 126 are left open. The pitch of a fan 110 is selected to draw air from opening 117 at the bottom of the craft and to exhaust it at opening 115 at the top of the craft. A similar control selection for each of the four fan 110 causes craft 100 to move downwardly in the air.

To propel craft 100 in a particular lateral direction, two diametrically opposed fans 110 aligned along that direction. may be used. In each of these two fans, flap 124 is activated to close duct 114, while flaps 128 and 126 are left open. The pitch of one of these two fans is selected to draw air from opening 117 at the bottom of the craft and to exhaust it at opening 119 at one end of the craft. The pitch of the other of the two fans 110 selected to move air in the opposite direction, namely to draw air from opening 119 at the other end of the craft and to exhaust it at opening 117 at the bottom of the craft. The combined action of the two fan 110 causes craft 100 to move laterally through the air along a line of flight passing through the two fans 110 being utilized. As will be apparent, numerous other combinations of flap positions and fan pitch selections make various other craft manuevers possible.

Variable pitch fans 110 and flap actuators 134, 136, and 138 can each be electrically operated and powered by generators 52. Alternatively, fans 110 may be powered by internal combustion engines.

Thus, lighter-than-air craft constructed in accordance with the various embodiments of the invention have several advantages. The discus shape, combined with the automatically controllable ailerons distributed about the circumference of the craft, increase stability and facilitate control. The adverse effects of changing winds and turbulent air currents on the craft, even while hovering, are reduced. Cargo and passengers can be loaded into or unloaded from the craft without the need of bringing the craft to the ground. The time and ground space required for loading and unloading procedures are minimized.

As will be apparent, the above-described craft are illustrative only of two specific embodiments of this invention, and can be modified in many ways by those skilled in the art. For example, deviations from a circular outline shown in FIGS. 2 and 6 can be made in each craft while still maintaining the discus-like shape. The size of the craft can be selected in terms of the payload to be carried. The propulsion mechanism described in connection with craft 100 can be varied in many ways. Instead of four variable pitch fans, one or more jet engines mounted internally of the craft could be used to move air through the propulsion control air ducts. Instead of, or in addition to, the air flow control flaps mounted internally of the craft 100, air control means, such as pivoted flaps or vanes, could be mounted at each air duct opening at the craft's outer surface. More or fewer air ducts, than are shown in craft 100 could be included. Also, in both of the embodiments, I described specific placements for various items such as passenger chairs, pilot chair and control panel, engines, power supplies and other items. These locations could change from craft to craft. Hence, I believe that these and other modifications are clearly within the true spirit and scope of the invention, and it is the object of the appended claims to cover all such modifications.

What I claim as new and desire to secure by Letters Patent of the United States is:

1. A lighter-than-air craft comprising:
   A. a discus-shaped hull including upper and lower hull portions;
   B. means for containing internally of said hull a volume of a lighter-than-air gas to provide lift to said craft;
   C. propulsion means mounted to said hull for moving said craft in flight;
   D. means for controlling said propulsion means; and
   E. stabilizing means comprising a plurality of ailerons distributed about the periphery of said upper hull portion and a plurality of ailerons distributed about the periphery of said lower hull portion, said ailerons being selectively movable relative to said hull portions to provide variable control surfaces for changing the orientation of said craft in flight.

2. A lighter-than-air craft as recited in claim 1 in which said hull is substantially symmetrically shaped about a vertical axis through the center of the craft, whereby the periphery of said hull is essentially circular in shape.

3. A lighter-than-air craft as recited in claim 2 in which the maximum thickness of said hull is no larger than about one-fifth of the overall diameter of said hull.

4. A lighter-than-air craft as recited in claim 2 in which said stabilizing means further includes
   i. means for sensing a change in the orientation of said craft, and
   ii. means coupled to said craft orientation sensing means for automatically actuating at least one of said ailerons to compensate for the sensed change.

5. A lighter-than-air craft as recited in claim 1 further including a passenger and crew compartment located at the top center of said hull.

6. A lighter-than-air craft as recited in claim 1 further including a payload pod located at the bottom center of said hull.

7. A lighter-than-air craft as recited in claim 6 in which said pod is detachable from said hull and said craft further includes means for raising and lowering said pod to the ground while said craft maintains altitude above the ground, whereby passengers and cargo can be loaded into and unloaded from said pod without bringing said craft to the ground.

8. A lighter-than-air craft as recited in claim 1 wherein
   A. said propulsion means includes first and second jet engines mounted at diametrically opposite positions at the periphery of said hull, said jet engines being rotatable in a vertical plane; and
   B. said propulsion means includes means for rotating said jet engines in the vertical plane to vary the direction of thrust therefrom.

9. A lighter-than-air craft as recited in claim 1 wherein:
   A. said propulsion means includes a plurality of air ducts communicating between an internal portion of said hull and opening at the exterior surface of said hull, and at least one fan mounted internally of said hull for moving air through said air ducts; and
   B. said propulsion control means includes means for varying the direction and volume of air moving through said air duct.

10. A lighter-than-air craft as recited in claim 1 in which said lighter-than-air gas containing means comprises a plurality of discrete lighter-than-air gas containing modules distributed internally of said hull.

11. A lighter-than-air craft comprising:
   A. a hull including upper and lower hull portions, said hull being discus shaped with a maximum thickness at the center of the hull and a gradually decreasing thickness in a radial direction to the periphery of the hull;
   B. means for containing internally of said hull a volume of a lighter-than-air gas to provide lift to said craft;
   C. propulsion means mounted to said hull moving said craft in flight;
   D. means for controlling said propulsion means;
   E. stabilizing means comprising
      i. a plurality of ailerons distributed about the periphery of said upper hull portion;
      ii. a plurality of ailerons distributed about the periphery of said lower hull portion;
      iii. said ailerons being selectively movable relative to said hull portions to provide variable control surfaces for changing the orientation of said craft in flight;
   F. a passenger and crew compartment located at the top center of said upper hull portion;
   G. a payload pod located at the bottom center of said lower hull portion beneath said passenger and crew compartment;
   H. a passageway connecting said payload pod to said passenger and crew compartment and extending through the center of said hull;
   I. means for detaching said payload pod from said hull; and
   I. means for detaching said payload pod from said hull; and
   J. means for raising and lowering said payload pod to the ground while said craft maintains altitude above the ground whereby passengers and cargo can be loaded into and unloaded from said pod without bringing said craft to the ground.

12. A lighter-than-air craft as recited in claim 11 in which said stabilizing means is automatically controllable and further includes means for sensing a change in the orientation of said craft and means coupled to said craft orientation sensing means for automatically actuating at least one of said ailerons to compensate for the sensed changed.

* * * * *